United States Patent
Saint Clair

(12) United States Patent (10) Patent No.: US 7,135,673 B2
Saint Clair (45) Date of Patent: Nov. 14, 2006

(54) IMAGING ROTATION ANGLE ABSOLUTE ENCODER

(75) Inventor: Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/977,046

(22) Filed: Oct. 29, 2004

(65) Prior Publication Data

US 2006/0091304 A1 May 4, 2006

(51) Int. Cl.
*G01D 5/34* (2006.01)
*G01J 9/00* (2006.01)

(52) U.S. Cl. .......................... 250/231.14; 250/231.13; 250/231.17; 250/231.18; 356/616; 356/617

(58) Field of Classification Search ................ 250/231.13–231.18, 237 R, 237 G; 341/11, 341/13; 356/616–620; 33/1 PT, 1 N, 1 L
See application file for complete search history.

(56) References Cited

U.S. PATENT DOCUMENTS

| | | | | |
|---|---|---|---|---|
| 4,384,204 A | * | 5/1983 | Tamaki et al. | 250/237 G |
| 4,987,299 A | * | 1/1991 | Kobayashi et al. | 250/231.14 |
| 5,428,217 A | | 6/1995 | Nakajima et al. | |
| 5,442,858 A | | 8/1995 | Wolters et al. | |
| 5,537,210 A | * | 7/1996 | Kaneda et al. | 356/499 |
| 5,965,879 A | | 10/1999 | Leviton | |
| 6,927,704 B1 | * | 8/2005 | Rouleau | 341/13 |
| 2004/0007663 A1 | * | 1/2004 | Steinlechner et al. | 250/231.16 |
| 2005/0040323 A1 | * | 2/2005 | Chong et al. | 250/231.13 |
| 2005/0116153 A1 | * | 6/2005 | Hataguchi et al. | 250/231.13 |

* cited by examiner

*Primary Examiner*—Stephone B. Allen
*Assistant Examiner*—Davienne Monbleau
(74) *Attorney, Agent, or Firm*—MacPherson Kwok Chen & Heid LLP; Tom Chen

(57) ABSTRACT

An angle absolute encoder comprises an encoded code rod that has code marks, such as pairs of fine code lines and coarse code lines. Light is reflected from or transmitted through the code marks and detected by a light detector to determine absolute angle position.

33 Claims, 2 Drawing Sheets

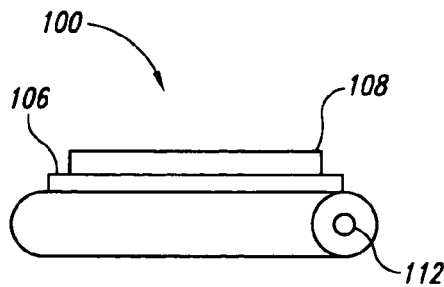
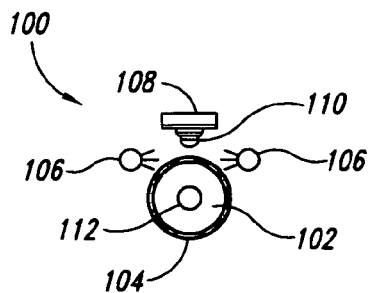
Fig. 1A  Fig. 1B
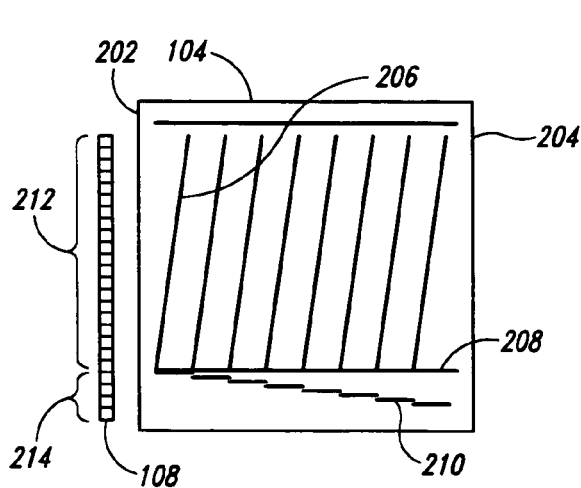
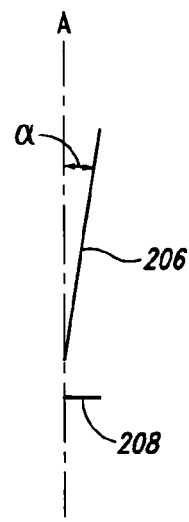
Fig. 2A  Fig. 2B

IMAGING ROTATION ANGLE ABSOLUTE ENCODER

BACKGROUND

1. Field of the Invention

The present invention relates generally to measuring devices and, more particularly, to absolute encoders for providing position information.

2. Related Art

Optical encoders are well known and employed for a variety of applications to detect position. An optical encoder measures a position of an object, either angular or linear, by optically detecting marks on a scale attached to the object to move with the object. In the simplest form, the encoder simply measures translation by counting the number of marks that move past the encoder's optical detector. One type of optical encoder is commonly known as an absolute encoder, which has the ability to recognize the position of a movable object without reference to a base, home, or starting position. In a conventional absolute encoder, each position is given by a unique code pattern of marks which identifies the absolute position, as opposed to just one mark. A change in position is sensed by detecting a change in the code bits which make up the code pattern.

In general, optical absolute encoders are provided with a light source, a rotary code disk and fixed plate, and light receiving elements, such as photodetectors. A code disk typically has apertures, slits, or other transparencies distributed over the area of the disk. The angular and radial coordinates of the transparencies on the disk are known, and this two dimensional information is used to provide higher angular resolution and range than the finite physical size an individual aperture could provide. The apertures are typically arranged in concentric annular rings, with each ring having a sequence of apertures, generally at the same radius and at equal angular intervals. The code disks are fixed to a rotating element of the assembly, and the optical detectors and light sources are attached to a fixed element. Variations on this theme exercise different illumination and detection arrangements and different shapes and distributions of apertures.

In a typical operation, the portion of light from the light source passing through light passage portions provided in the rotary code disk and slits provided in the fixed plate is converted into electric signals by the photodetectors, thereby allowing detection of the angle of rotation and the position of rotation. The light passage portions of the rotary code disk are comprised of a plurality of concentric code patterns and a reference pattern. The slits of the fixed plate are provided corresponding to the code patterns and reference pattern. To increase accuracy or precision, the number of light passage portions and slits are increased, which also increases the cost, complexity, and physical package size of the encoder.

Measurement applications are currently requiring higher and higher degrees of angular precision, e.g., less than a few microradians. Current high precision encoders, such as the Model BS-0001 built by Automated Precision Inc., of Gaithersburg, Md., uses a compact gimbal stage and has a pointing accuracy of less than 2 microradians in each of two axes. Other types of high precision encoders, such as one built by Dr. Johannes Heidenhain, able to provide approximately 0.17 microradian resolution. However, such high precision encoders have the disadvantage of being large in size, e.g. greater than 6" in diameter.

Accordingly, it is desirable to have a high precision absolute encoder that is smaller in size than conventional high precision encoders as discussed above.

SUMMARY

According to one aspect of the present invention, an absolute encoder uses a code rod, instead of a code disk, for precisely measuring in real time the rotation angle of a mechanical rotary stage. The encoder comprises a cylindrical rod attached to a rotating element and a high density linear photodetector array which images incoherent light reflected from (or transmitted through) a code pattern on the surface of the code rod.

In one embodiment, the encoder includes a stationary linear photodetector array placed in close proximity to a cylindrical rod having an encoded surface and attached co-axially to the rotating element of a mechanical rotation stage. The linear array images externally applied light reflected from the code markings on the encoded cylinder. A cylindrical lens equal in length to the linear array may be used to image cylinder markings on to the array. The linear array attaches to the fixed element of the rotation stage. The encoded portion of the surface of the cylinder is as long as the sensing portion of the linear array and is marked with a sequence of line pairs. The line shape may be a top hat function in absorption, reflectivity, or transmissivity. It may also be Gaussian, a sine function, or a random, pseudo-random, or Gray code. Each line pair consists of a short line segment and a long line segment. The line pairs divide the 360 degrees of rotation of the cylinder into contiguous arc segments. The sensor elements at the end of the linear array are dedicated to imaging the coarse code line segments, thus identifying which coarse arc segment is in view of the sensor. The remaining sensor elements are used to image the fine code lines, and thereby to measure with high precision where within the coarse arc segment the cylinder has rotated. One of the coarse code lines, the closest to the fine code lines, is dedicated to providing a wobble reference. This reference code line extends the full circumference of the rod.

Using a cylindrical code rod allows absolute encoders to achieve higher accuracies at smaller sizes as compared with code disks. For example, to achieve good resolution (e.g., 0.01" or 48 nanoradians) with the Renishaw RESR series requires a ring that is about 413 mm in diameter. To achieve the same resolution and much better accuracy with a 12 bit system using the present invention requires a rod that is only 55 mm in diameter. In another example, the MicroE Systems M3500 encoder requires an optical diameter of 4 inches to get to 2 arc seconds. The present invention is believed to be able to achieve more than 10 times better accuracy for only 2 inch diameter for the code rod.

Furthermore, because the code rod has a much smaller diameter than code disks and a relatively short length, the size of bearings required could also be reduced. This potentially leads to a smaller polar moment of inertia, which is directly proportional to the square of the radius and proportional to the mass. The smaller polar moment would be advantageous to the control side of the design.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 1A and 1B show side and end views, respectively, of an absolute angle encoder according to one embodiment of the present invention;

FIG. 2A shows one embodiment of an encoded surface of the code rod according to one embodiment;

FIG. 2B shows a code line pair from the encoded surface of FIG. 2A;

Embodiments of the present invention and their advantages are best understood by referring to the detailed description that follows. It should be appreciated that like reference numerals are used to identify like elements illustrated in one or more of the figures.

DETAILED DESCRIPTION

Figure 3:
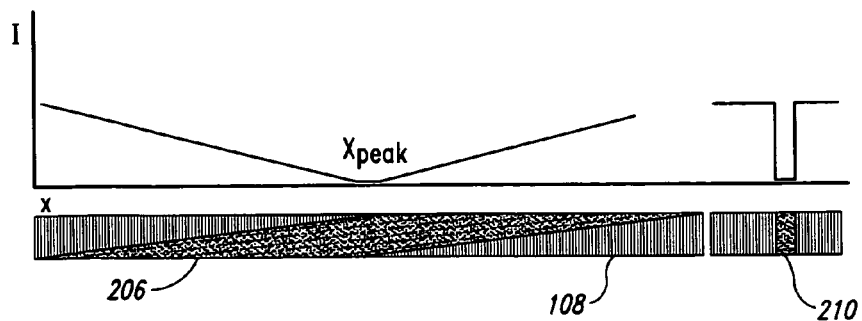
FIG. 3 shows an image of a code line pair of FIG. 2A on a linear array of FIGS. 1A and 1B.

FIGS. 1A and 1B show side and end views, respectively, of an absolute angle encoder 100 according to one embodiment of the present invention. Encoder 100 includes a cylindrical rod 102 having an encoded surface 104. Light sources 106, such as an array of light emitting diodes, are positioned along the length of rod 102. Light emitted from light sources 106 is reflected from encoded surface 104 and detected by a light detecting linear array 108, such as an array of photodetectors. A cylindrical lens 110 is located between linear array 108 and rod 102. A drive shaft 112 rotates rod 102. As rod 102 rotates, the encoded pattern on encoded surface 104 is illuminated and detected by light array 108 to determine an absolute angular position, as will be discussed in more detail.

FIGS. 2A and 2B show one embodiment of encoded surface 104 according to one embodiment. In this embodiment, surface 104 is encoded with a top hat function. FIG. 2A shows surface 104 "unrolled" from rod 102, where side edge 202 and side edge 204 are brought together to form the cylinder shape, i.e., the rotational axis of the drive shaft or rod is in the vertical direction. The encoded portion of surface 104 has a length, in the vertical direction, approximately the same as the sensing portion of linear array 108 and is marked with a sequence of M line pairs. FIG. 2A shows 8 lines pairs for clarity, with one line pair shown in FIG. 2B. M can be a wide range of numbers, depending on the precision needed and the characteristics of linear array 108, with M=200 in this example.

In one embodiment, each line is defined spatially as a top-hat function in absorption, reflectivity, or transmissivity. In other embodiments, the line shape may be Gaussian. One line pair consists of a long line segment, which may be referred to as a fine code line 206, and a wobble reference line 208, which is a coarse code line that extends the full circumference of rod 102. The remaining M−1 line pairs each consist of a short line segment, which may be referred to as a coarse code line 210, and a long line segment or fine code line 206. Note that in this embodiment, the reference line 208 is the "short" line closest to the M fine code lines 206.

FIG. 2B shows a typical line pair. The coarse code line 210 is oriented perpendicular to the axis of the cylinder, and is 1/Mth (or 1/200$^{th}$ in this example) the circumference of the cylinder in length. The orientation of the fine code line 206 makes a small angle α with the cylinder axis and extends approximately 95% of the length of linear array 108. The angle α is given by equation (1):

$$\alpha = \tan^{-1}(2\pi r/(ML_f)) \quad (1)$$

where r is the radius of the rod 102, $L_f$ is the length of the array 108 dedicated to the fine lines 206, and M is the number of coarse code lines 210. The coarse code lines 210 are located with an axial offset from adjacent coarse lines 206 by easily resolved spaces. Thus, the M (i.e., 200 In this example) line pairs divide the 360° of rotation of the cylinder into M contiguous arc segments of 360°/M or 1.8° in this example.

In FIG. 2A, linear photodetector array 108 is designated with two portions 212 and 214. Portion 212, comprising the majority of array 108, is used to image fine code lines 206, and thereby to measure with high precision where, within the coarse arc segment, the cylinder has rotated. Portion 214 is dedicated to imaging coarse code lines 210, thus identifying which coarse arc segment is in view of the sensor. For example, array 108 can have thousands of pixels, e.g., 4096. Portion 214 may then comprise the 100 or 200 sensor elements at the end of the linear array.

It is the variation in intensity along the linear photodetector array that encodes the fine resolution measurement of the angle. The fine code line is oriented at an angle α to the code rod axis to induce the variation along the array. Rotating the code rod about its symmetry axis, which is parallel to the linear array, changes the pattern of variation of intensity on the array in a regular and well defined way. That is, the point of intersection of the fine code line 206 and the line defined by the linear array corresponds to the fine angle α, and the point of intersection moves along the linear array as the rod rotates. In FIG. 2A, this is equivalent to sliding the pattern 104 horizontally across the array 108.

The position that the image of the each line segment occupies on the array is measured by image processing techniques. With proper illumination, and contrast in the markings (e.g., black (or white) painted marks on a white (or black) background), the centroid of the line image on the array is a measure of the angular position of the cylinder. In the above example, at the beginning of a 1.8° coarse arc segment, the image will show a centroid near one end of the array, say at pixel 1. At the end of a 1.8° rotation, the centroid will be at the other end of the array, say at pixel 3996. The centroid will be found at any position in between, depending on the angular position of the rotation stage. By locating the centroid to subpixel accuracy, the 1.8° interval can be divided into more resolution elements. According to references in the open literature, the measurement of the location of a line edge is possible with uncertainty Δp of 1/140 pixel in a single frame. This corresponds to an encoder resolution given by equation (2):

$$\Delta\phi = 2\pi * \Delta p/(M*(N-n)) \quad (2)$$

where M is the number of line pairs, N is the number of pixels, and n is the number of sensor elements in portion 214 of the array. In the above example, Δφ=2π/(200*3996*140) radians=56.2 nanoradians. Note that the resolution improves as the number of pixels increases and also as the number of code lines increases.

In the embodiment of FIG. 2A, two reference lines 208 and 216 are shown, which enable the angle to be encoded into the difference in location of the code lines and the reference lines imaged onto the linear array. Using the reference lines adds to the uncertainty in the measurement and slows down the measurement, but allows the encoder to be much less sensitive to the wobble of the rotary stage.

FIG. 3 shows an image of a code line pair (fine code line 206 and coarse code line 210) on linear array 108, assuming that the lines themselves are black on a white background. The inverse situation of white line pairs on a black background is also easily implemented. The widths of the code lines do have constraints. Adjacent coarse code lines 210 are sufficiently offset so that adjacent code lines are clearly distinguished. Also the total length along the code rod axis of all coarse code lines 210 is n*d, where n is the number of sensor elements associated with the coarse code lines, and d is the length of the pixels in the axial direction.

The offset should be at least several times the uncertainty of the location of the line, e.g., a relatively conservative choice is 0.9 pixels of offset. Using this example, 200 coarse code lines would take up at least 180 pixels of the array. In addition to the space for the pixels or sensors, the area of linear array 108 dedicated to the coarse lines also includes the width of the coarse line and any free boundary between coarse and fine code regions. So, continuing the example, if lines are 10 pixels wide and the pixel free region between coarse and fine code regions is 10 pixels, the linear array needs 200 pixels for the coarse line pattern. A typical linear array has pixels that are 7 microns square. Thus, the coarse code line in this example is 70 microns wide or almost 0.003 inches. The code line offset is 6.3 microns, which is easily producible in view of the current photolithography resolution limit of <1 micron.

In a step function code line realization, the fine code lines 206 can be thought of as a square wave pattern rotated at an angle with respect to the cylinder axis. There are several approaches to extracting the intersection point of fine code line 206 with linear array 108. The most straightforward is by a centroid calculation, which is just the first moment of the intensity distribution. Another approach locates the edges of the line on the array and analytically calculates the midpoint. For a Gaussian line shape, the tilted line is also a Gaussian on the linear array. Fitting the pixel data to a Gaussian and extracting the center of the Gaussian as the encoded angle is still another approach. The results of a simulation of the Gaussian fit angle measurement are given below in Table 1. The simulation assumed the following: the number of pixels is 6 times the expected width, the line is centered on those pixels, and there are 200 code segments. Table 1 shows the results for a signal to noise ratio of 50 dB using the Levenberg-Marquardt technique for nonlinear least squares:

TABLE 1

| Number of Pixels | Angle error (radians) | Width (pixels) |
| --- | --- | --- |
| 18 | 7.86 × 10E−9 | 3 |
| 288 | 15.7 × 10E−9 | 48 |
| 1152 | 62.9 × 10E−9 | 192 |

One disadvantage of the discrete top-hat fine code line is that as the number of code segments increases, the angle the fine code line makes with the rod becomes smaller (for fixed rod diameter), and the width of the line then becomes larger, as 1/sin(tilt angle). Since the narrower the line width, the less the uncertainty in the line location, the number of segments trades off against the width for encoder resolution. In some limit, the line width is a significant fraction of the linear array length.

Figure 4:
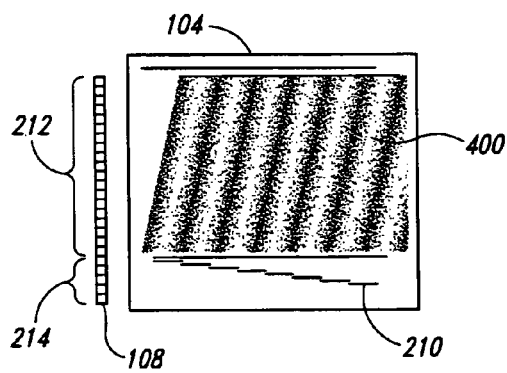
FIG. 4 shows another embodiment of an encoded surface of the code rod.

According to another embodiment of the invention, shown in FIG. 4, the fine code line pattern 400 is defined as a pure sine wave of a single spatial frequency, implemented as a continuous sinusoidal variation in absorption, reflectivity, or transmissivity over the surface of the rod. The spatial frequency is determined by the required performance of the encoder. The sine function pattern is tilted with respect to the code rod axis, and thus also with respect to the linear array 108. The linear array 108 detects a sinusoidal variation in illumination at a different spatial frequency, an aliased frequency in a moire' sense, depending on the angle of tilt. With the proper choice of parameters, the array will detect exactly one cycle of the aliased frequency. As the rod rotates, the phase of the single cycle changes continuously, and the angle is thus encoded into the phase of the sinusoid. To avoid ambiguity, the phase may be changed by no more than $2\pi$ within the arc segment of any coarse line segment. The following analysis demonstrates the aliasing, and how the phase encodes the angle.

First, a two dimensional transmission function, $f(x_p, y_p; s)$, is defined in equation (3). The function is constant in $y_p$, and a perfect sine function in $x_p$, at spatial frequency s (cycles/inch).

$$f(x_p, y_p; s) = A \sin(2\pi s x_p) + B \quad (3)$$

The amplitude A and baseline B are chosen for convenience, assuming the linear array output will be digitized to 8 bits (256 full scale). In this example, A is 100 and B is 140. The pattern of equation (3) is tiled by an angle $\alpha$. The linear array 108 will sense the tilted pattern in its own coordinate system, transforming the pattern by a rotation. In linear array coordinates, the function becomes $$f_1(x, y; s_\alpha) = A \sin[2\pi s(x \cos(\alpha) - y \sin(\alpha))] + B \quad (4)$$

where x is measured transverse to the long dimension of the linear array, and y is measured parallel to the long dimension of the linear array.

Holding constant the first term in the argument of the sine function, a simple sinusoidal variation is obtained along the long dimension of the linear array as y varies, with a new spatial frequency given by:

$$s_y = s * \sin(\alpha) \quad (5)$$

The phase of the sine function is given by the first term in the argument, where the phase varies transverse to the linear array or as the code rod rotates. Again this effect can be seen by translating the code pattern 104 in FIG. 2A across the array 108. At each value of x, a complete sinusoid is detected on all pixels of the linear array 108 dedicated to the fine code lines 206, and fitting the data to a simple sine function minimizes the effect of random noise in proportion to the number of pixels utilized.

Similarly, by fixing the second term of equation (4), a sinusoidal variation in intensity with x results, having spatial frequency given by:

$$s_x = s * \cos(\alpha) \quad (6)$$

The parameters of code rod 102 are its radius, its length, the spatial frequencies, and the angle of tilt. The constraints placed on these parameters are a single cycle over the length of the array dedicated to the fine code lines, and M cycles over the circumference of the array. Thus:

$$s_x = s * \cos(\alpha) = M/2\pi r \quad (7a)$$

$$s_y = s * \sin(\alpha) = 1/L_f \quad (7b)$$

where r is the radius of the rod 102, and $L_f$ is the array length imaging the fine code lines (or portion 212 in FIG. 2A). As before, s is the spatial frequency of the untilted pattern. These two equations are solved to provide design equations for the code rod:

$$\alpha = \tan^{-1}(2\pi r/(ML_f)) \quad (8a)$$

$$s = \sqrt{\left(\frac{M}{2\pi r}\right)^2 + \left(\frac{1}{L_f}\right)^2} \quad (8b)$$

To select a spatial frequency such that at the tilt angle $\alpha$ exactly one cycle of the pattern appears across $n_p$ samples along the new y axis, the argument of the sine function is set equal to $2\pi$ at x=0. For example, let the pixel size in the y direction be $$\Delta y = 7*10E-4 \text{ cm} \quad (9)$$

and let the number of pixels in the linear array dedicated to the fine code pattern be $$n_p = 3896 \quad (10)$$

The length in y over which a single complete cycle of variation in intensity occurs is then $$L_f = \Delta y * n_p = 2.729 \text{ cm or } 1.074 \text{ inches} \quad (11)$$

i.e., $s_x = 1/L_f$. A convenient choice for the tilt angle $\alpha$ is $2\pi/M$, which is equivalent to setting r equal to $L_f$. Then the spatial frequency, s, the sine pattern may have is given by:

$$s \approx M/2\pi L_f = 29.638 \text{ cy/in} \quad (12)$$

Thus the geometry of the code rod with the sine pattern is a cylinder at least 1.129 inches long ($7\times10^{-4}*(3896+200)/2.54$), with a radius of 1.074 inches. This length corresponds to a linear array with 4096 elements, 200 elements of which are reserved for imaging the 200 coarse code lines 210 which are at the bottom of the fine pattern and orthogonal to the y axis of the linear array. Note that determining with this geometry the location of the peak in intensity along the linear array only to the nearest pixel results in a resolution of ~8 microradians. Since the functional form of the intensity pattern is known, the function can be fitted to the data from the linear array to achieve an accuracy limited by random noise, and resolution limited by noise and numerical effects.

The following provides additional detail. As shown above, the functional form of the intensity on the array is given by:

$$z = C\sin(\phi + 2\pi s_y y) \quad (13)$$

where z is the intensity, C is a constant depending on the peak transmission and the size of the pixels, y is the pixel coordinate, and $\phi$ is the phase to be extracted from the data. This is a nonlinear function of the phase. To evaluate the quality of the fit, a Monte Carlo simulation is performed. Intensity values were generated from the function of equation (13) for known amplitude and phase. Real measured data were simulated by perturbing the exact values with additive Gaussian deviates, which simulates image data with noise levels typical of that found in candidate imaging systems. Table 2 shows simulation results using the Levenberg-Marquardt technique for nonlinear least squares for a signal to noise ratio of 50 dB.

TABLE 2

| Number of pixels | Phase error (radians) | Phase uncertainty (radians) |
|---|---|---|
| 300 | 1.5 × 10E−6 | 4.73 × 10E−6 |
| 3900 | 6.0 × 10E−8 | 3.63 × 10E−7 |

With either of the code patterns discussed above (or any other suitable code pattern), the encoded code rod can be formed, in one embodiment, by attaching a coded sheet or film around the rod. The coded sheet may be removable. Any misalignment of the code sheet during the attachment process can be calibrated out using conventional methods. Fabrication can also be performed by laser scribing, electroforming, simple milling, photolithography, and simple printing.

Figures 5A, 5B:
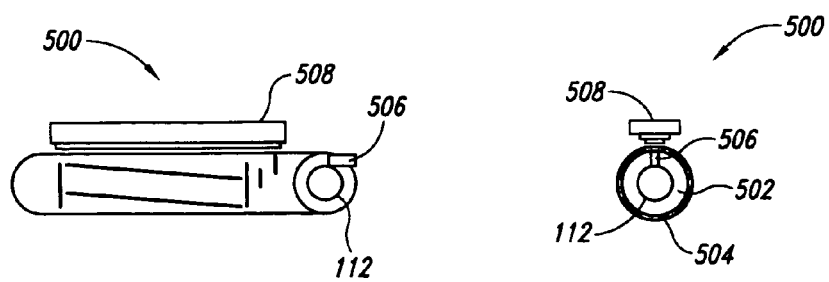
FIGS. 5A and 5B show side and end views, respectively, of an absolute angle encoder according to another embodiment of the present invention.

FIGS. 5A and 5B show side and end views, respectively, of an absolute angle encoder 500 according to another embodiment of the present invention. As with encoder 100 of FIGS. 1A and 1B, encoder 500 includes a cylindrical rod 502 having an encoded surface 504 and a light detecting linear array 508. However, instead of being a solid reflective rod, cylindrical rod 502 is a hollow transparent code rod. A light source 506 is positioned within the hollow rod, as opposed to externally with the encoder of FIG. 1. The light source is a distributed source of (coherent or incoherent) radiation in the wavelength region to which the detecting array is sensitive, typically the visible and near infrared. Since the light source could be mounted on the axis inside the rod and proximity focusing could be used, a more compact device is possible due the elimination of the cylindrical lens. An off-axis fiber optic light source is conceivable that would provide a hollow transparent code rod with sufficient illumination to permit the proximity focusing configuration with both types of rotation tables. The thick wall of the hollow code rod acts as a light pipe.

Light emitted from light source 506 is transmitted through encoded surface 504 and detected by light detecting linear array 508, such as an array of photodetectors. As rod 102 rotates, the encoded pattern on encoded surface 504 is illuminated and detected by light array 508 to determine an absolute angular position.

Embodiments described above illustrate but do not limit the invention. It should also be understood that numerous modifications and variations are possible in accordance with the principles of the present invention. For example, a top hat Gaussian or sine function code pattern is described. However, the code pattern for the encoded rod can be any suitable pattern, such as a random code pattern, a pseudo-random code pattern, or a Gray code pattern. Accordingly, the scope of the invention is defined only by the following claims.

What is claimed is:

1. An absolute encoder, comprising:
   a light source;
   an encoded code rod, wherein the rod has an outer surface encoded with code marks for determining angular position, wherein the code marks comprise a fine code line pattern and a plurality of staggered non-overlapping approximately equal length coarse code lines around the circumference of the code rod, with the coarse code lines oriented approximately perpendicular to the axis of rotation of the code rod; and
   a light detector configured to detect light reflected from or transmitted through the code marks.

2. The encoder of claim 1, wherein the fine code line pattern comprises a plurality of fine code lines.

3. The encoder of claim 2, wherein the fine code lines are offset from the axis of rotation of the code rod by a non-zero angle.

4. The encoder of claim 3, wherein the encoded code rod further comprises a reference mark extending continuously around the circumference of the rod.

5. The encoder of claim 1, wherein the light detector comprises a linear array of photodetectors, the length of the array at least as long as the length of the code rod.

6. The encoder of claim 1, wherein the fine code line pattern is selected from the group consisting of a top hat Gaussian and a sine function.

7. The encoder of claim 1, wherein the light source is located external to the code rod.

8. The encoder of claim 7, further comprising a cylindrical lens positioned between the light detector and the code rod.

9. The encoder of claim 1, wherein the light source is located within the code rod.

10. The encoder of claim 1, wherein the total length of the coarse code lines is approximately equal to the circumference of the code rod.

11. The encoder of claim 1, wherein each coarse code line corresponds to one fine code line to form a code line pair.

12. The encoder of claim 11, wherein each code line pair comprises non-parallel fine and coarse code lines.

13. A method of determining an absolute angle position of an object, the method comprising:
provoding an encoded code rod;
rotating the code rod; and
detecting code marks on the code rod to determine absolute angle position, wherein the code marks comprise a fine code line pattern and a plurality of non-overlapping coarse code lines around the circumference of the code rod, with the coarse code lines oriented approximately perpendicular to the axis of rotation of the code rod and having a total length approximately equal to the circumference of the code rod, wherein the detecting comprises determining which one of the coarse code lines is in view of a sensor and measuring a corresponding fine code line to determine where within the coarse code line the code has rotated.

14. The method of claim 13, wherein the detecting comprises:
reflecting light from the code marks; and
detecting the reflected light corresponding to the code marks.

15. The method of claim 13, wherein the fine code line pattern comprises a plurality of fine code lines.

16. The method of claim 15, wherein the fine code lines are offset from the axis of rotation of the code rod by a non-zero angle.

17. The method of claim 13, wherein the fine code line pattern is selected from a group consisting of a top hat Gaussian and a sine function.

18. The method of claim 13, wherein the detecting comprises:
transmitting light through the code marks; and
detecting the transmitted light corresponding to the code marks.

19. The method of claim 13, wherein each coarse code line corresponds to one fine code line to form a code line pair.

20. The method of claim 19, wherein each code line pair comprises non-parallel fine and coarse code lines.

21. A code rod for an absolute encoder, the code rod comprising code marks located along the circumference and length of the rod, wherein the code marks are used to determine an absolute angle position and comprise a fine code line pattern and a plurality of non-overlapping coarse code lines around the circumference of the code rod, with the coarse code lines oriented approximately perpendicular to the axis of rotation of the code rod and each fine code line corresponds to a coarse code line to form a code line pair, and wherein the coarse code lines are staggered and approximately of equal length.

22. The code rod of claim 21, wherein the fine code line pattern comprises a plurality of fine code lines.

23. The code rod of claim 22, wherein the fine code lines are offset from the axis of rotation of the code rod by a non-zero angle.

24. The code rod of claim 21, wherein the fine code line pattern is selected from the group consisting of a top hat Gaussian and a sine function.

25. The code rod of claim 21, further comprising a reference mark extending continuously around the circumference of the rod.

26. The code rod of claim 21, further comprising a light source located within the code rod.

27. A code rod for an absolute encoder, comprising:
a cylindrical rod;
code marks located along the circumference and length of the rod, the code marks comprising:
a fine code line pattern; and
a plurality of staggered non-overlapping approximately equal length coarse code line segments around the circumference of the rod and between the fine code line pattern and a first end of the rod, wherein the coarse code lines are oriented approximately perpendicular to the axis of rotation of the code rod; and
a reference line along the circumference of the rod and between the fine code line pattern and a second end of the rod.

28. The code rod of claim 27, further comprising a second reference line along the circumference of the rod and between the fine code line pattern and the other end of the rod.

29. The code rod of claim 27, wherein the first and second ends are the same end.

30. The code rod of claim 27, wherein the first and second ends are at opposite ends.

31. A method of determining an absolute angle position of an object, the method comprising:
providing an encoded code rod;
rotating the code rod; and
detecting code marks on the code rod to determine absolute angle position, wherein the code marks comprise a fine code line pattern and a plurality of non-overlapping coarse code lines around the circumference of the code rod, with the coarse code lines oriented approximately perpendicular to the axis of rotation of the code rod and staggered and approximately of equal length, wherein the detecting comprises determining which one of the coarse code lines is in view of a sensor and measuring a corresponding fine code line to determine where within the coarse code line the code has rotated.

32. A code rod for an absolute encoder, the code rod comprising code marks located along the circumference and length of the rod, wherein the code marks are used to determine an absolute angle position and comprise a fine code line pattern and a plurality of non-overlapping approximately equal length coarse code lines around the circumference of the code rod, with the coarse code lines oriented approximately perpendicular to the axis of rotation of the code rod and each fine code line corresponds to a coarse code line to form a code line pair, and wherein the total length of the coarse code lines is approximately equal to the circumference of the code rod.

33. A code rod for an absolute encoder, the code rod comprising code marks located along the circumference and length of the rod, wherein the code marks are used to determine an absolute angle position and comprise a fine code line pattern and a plurality of non-overlapping coarse code lines around the circumference of the code rod, with the coarse code lines oriented approximately perpendicular to the axis of rotation of the code rod and each fine code line corresponds to a coarse code line to form a code line pair, and wherein each code line pair comprises non-parallel fine and coarse code lines.

* * * * *